United States Patent
Sylvester et al.

(10) Patent No.: US 9,542,513 B2
(45) Date of Patent: Jan. 10, 2017

(54) MULTIMODE EXECUTION OF VIRTUAL HARDWARE MODELS

(71) Applicant: ARM Limited, Cambridge (GB)

(72) Inventors: Brian Scott Sylvester, Hopkinton, MA (US); William Neifert, Lexington, MA (US); Joseph Tatham, Carlisle, MA (US); Matt Grasse, Framingham, MA (US); Ronald Scott Maxwell, Stow, MA (US)

(73) Assignee: ARM LIMITED, Cambridge (GB)

( * ) Notice: Subject to any disclaimer, the term of this patent is extended or adjusted under 35 U.S.C. 154(b) by 444 days.

(21) Appl. No.: 13/955,636

(22) Filed: Jul. 31, 2013

(65) Prior Publication Data

US 2015/0039282 A1    Feb. 5, 2015

(51) Int. Cl.
*G06F 9/44* (2006.01)
*G06F 17/50* (2006.01)

(52) U.S. Cl.
CPC ......... *G06F 17/5022* (2013.01); *G06F 17/504* (2013.01); *G06F 17/5027* (2013.01); *G06F 17/5031* (2013.01)

(58) Field of Classification Search
CPC  G06F 17/5022; G06F 17/504; G06F 17/5031; G06F 17/5027; G06F 13/362
See application file for complete search history.

(56) References Cited

U.S. PATENT DOCUMENTS

| | | | |
|---|---|---|---|
| 6,810,442 B1 * | 10/2004 | Lin | G06F 17/5022 703/27 |
| 7,613,599 B2 | 11/2009 | Bade et al. | |
| 7,739,360 B2 | 6/2010 | Watson et al. | |
| 7,970,596 B2 | 6/2011 | Bade et al. | |
| 8,666,723 B2 | 3/2014 | Xie et al. | |
| 2002/0059054 A1 | 5/2002 | Bade et al. | |
| 2003/0225565 A1 * | 12/2003 | Garcia | G06F 17/5022 703/23 |
| 2005/0022143 A1 * | 1/2005 | Butts | G06F 17/5022 716/102 |
| 2006/0282233 A1 * | 12/2006 | Pasricha | G06F 17/5022 703/1 |
| 2008/0235415 A1 * | 9/2008 | Clark | G06F 17/5031 710/105 |
| 2009/0077621 A1 * | 3/2009 | Lang | H04L 63/20 726/1 |
| 2010/0017185 A1 | 1/2010 | Bade et al. | |
| 2011/0307847 A1 * | 12/2011 | Liao | G06F 17/5027 716/103 |
| 2012/0317526 A1 * | 12/2012 | Sato | G06F 17/504 716/107 |
| 2013/0054854 A1 * | 2/2013 | Li | G06F 13/362 710/110 |
| 2014/0304685 A1 | 10/2014 | Xie et al. | |

* cited by examiner

*Primary Examiner* — Kandasamy Thangavelu
(74) *Attorney, Agent, or Firm* — Leveque Intellectual Property Law, P.C.

(57) ABSTRACT

The disclosure contains descriptions of various methods and systems for accelerating the execution of a virtual prototype simulation. Acceleration may be achieved, for example, by providing two or more redundant virtual communication paths for access made by virtual models of a virtual prototype of a hardware design to provide for both accelerated access transactions and time-accurate access transactions. A model having such redundant virtual communication paths is referred to herein as a "multimode model."

20 Claims, 9 Drawing Sheets

MULTIMODE EXECUTION OF VIRTUAL HARDWARE MODELS

BACKGROUND

A standard part of the design process for leading edge system on chip (SoC) designs is to create a prototype of the design before it is fabricated to silicon. This prototype can take several forms depending upon the design problem being addressed. It is not unusual for multiple prototypes to be created of the same design in order to best address specific design issues. There are two primary types of prototypes: physical prototypes and virtual prototypes.

Virtual prototypes form a software-only representation of a system on chip design. Depending upon the accuracy of the virtual prototype, it can execute at a full range of speeds. The virtual prototype can execute much faster than the actual hardware which it represents or much more slowly in cases where the virtual prototype is more accurately representing the behavior of the underlying hardware. The virtual prototype typically contains a collection of virtual prototype models, each virtual prototype model representing the various hardware components in the SoC design being modeled.

Whereas a hardware prototype necessarily represents all of the functionality of the modeled components, this is not necessarily true for virtual prototypes. It is common practice to abstract the timing details of a virtual prototype model in order to achieve faster execution speed. In some cases, the functionality of a virtual prototype model may also be abstracted to achieve faster performance or shorten model development time. Each component may be modeled at a different level of timing or functional accuracy depending upon the needs of the designer.

Depending upon the abstraction level of the individual models, virtual prototypes may be used at various points during the SoC design cycle. Accurate virtual prototypes can be used to perform architectural analysis, semiconductor intellectual property (IP) core selection and firmware development. A virtual prototype which does not have timing accuracy would likely not be used in this case due to lacking sufficient design detail. Higher speed, more abstract virtual prototypes can boot an operating system and execute application code, all before actual silicon is fabricated. While accurate virtual prototypes may be used for these tasks as well, it is rarely done due to the much slower execution times.

The accuracy of a virtual prototype type depends upon the accuracy of the virtual prototype models it contains. Indeed, there can be multiple virtual prototype models at different levels of abstraction contained in the same virtual prototype. Accuracy in this case does not typically refer to the functional accuracy of the prototype but more to the timing of the system. Most virtual prototypes will represent all of the functionality of the modeled component but with varying levels of timing accuracy. Most virtual prototypes are written based upon the transaction-level modeling (TLM) standard, produced by the Accellera Systems Initiative of Napa, Calif. and incorporated into the Institute of Electrical and Electronics Engineers Standards Association (IEEE-SA) 1666 standard for SystemC™. The TLM specification describes coding guidelines for a loosely-timed (LT) and approximately-timed (AT) level of abstraction. In a loosely timed virtual prototype, the models contained in the virtual prototype will either be completely untimed or will correlate their timing to actual execution time only at transaction boundaries. In an approximately timed virtual prototype, the virtual prototype model typically correlates to the system time at the boundary of every transaction and will often include additional timing information for actions which occur in the middle of a transaction. Commercially available loosely timed models include the Fast Models for ARM® (ARM Holdings of Cambridge, UK) and the Open Virtual Platforms™ (OVP™ of Oxfordshire, UK) designed by Imperas™ Software of Oxfordshire, UK.

Additionally, there are cycle accurate (CA) virtual prototypes which completely model the behavior of the underlying hardware. These models can either be hand-written to model this behavior and then validated against the actual design, or created automatically from the HDL representation of the component. For example, some commercially available cycle accurate virtual prototype models are created directly from HDL using the Carbon Model Studio product from Carbon Design Systems of Acton, Mass.

A typical system on chip design contains one or more processors communicating with one or more additional peripheral components such as a memory controller, an external interface block (e.g., Peripheral Component Interconnect Express (PCI-Express) bus, Universal Serial Bus (USB), serial bus, etc.) and/or additional controller logic (e.g., Direct Memory Access (DMA) controller, etc.). The individual hardware components of the system on chip design typically communicate over a system bus using memory-mapped accesses to various configurable regions. Thus, from a software perspective, communication with any hardware component can be achieved by reading or writing to memory regions or locations. It is common practice when creating a higher level virtual prototype of a system to leverage this communication mechanism and accelerate communications by bypassing peripheral components (e.g., the timing and functionality thereof) through direct memory accesses (e.g., to an identified memory region or register).

While it may be straightforward to create a high level model for accessing the memory contents by discounting the behavior and effects of the various intermediate peripheral components, not all functionality may be handled appropriately. For example, there are registers in the memory controller and functional details difficult to map into a high level model. Implementation details such as read-only or write-only register fields are easily mishandled as are potential side-effects of access transactions. For example, reading a register may cause three other registers to update some additional information. There is a need for a solution which provides adequate speed for aiding in software development, while providing accurate analysis for validating the behavior of the underlying hardware, including the effects of time-dependent access transaction behavior.

SUMMARY

The present disclosure contains descriptions of various methods and systems for accelerating the execution of a virtual prototype simulation. Acceleration may be achieved, for example, by providing two or more redundant virtual communication paths for access to memory contents, register state and memory-mapped input/output (I/O) operations made by virtual models of a virtual prototype of a hardware design to provide for both accelerated access transactions and time-accurate access transactions. A model having such redundant virtual communication paths to access memory contents, register state and memory-mapped I/O operations is referred to herein as a "multimode model."

In the hardware being modeled by the multimode model, an access path includes two or more functional representations. The functional representations may include a memory controller, an external interface block such as a PCI-Express, USB, serial bus, and/or controller logic such as a DMA controller. A first (e.g., cycle accurate/low level) virtual communication path may include functional representations with complete (e.g., time-accurate) accuracy, while a second (e.g., loosely timed/higher level) virtual communication path may bypass two or more functional representations of the hardware being modeled, and a third (e.g., fast path/ optimized) communication path may bypass all functional representations within the access path which functionally lie between the access point and the accessed contents, allowing the contents of the multimode virtual model to be directly accessed.

A multimode model can be generated in an automatic or semi-automatic fashion depending upon a desired functionality. Information accessed during multimode model creation may include an accurate model representation of a memory controller design, register-transfer-level (RTL) implementation details of the virtual model, memory size information, memory configuration information (e.g., start addresses of regions, end addresses of regions, etc.), a physical communication layer (PHY) virtual model representation, and memory port mapping information. A portion of this information, in some implementations, is generated based upon other information provided. For example, the memory port mapping information may be generated from analysis of the memory controller model.

In some implementations, a user may configure access criteria or rules associated with the two or more redundant communication paths. The criteria or rules may be used during execution to route transaction accesses within the multimode model. For example, selection of the particular virtual communication path to use to perform a particular access (e.g., read, write, copy, etc.) may be based upon one or more of a memory region accessed, a physical connection port used for the access, a port type used for the access, a point of time within the virtual prototype simulation (e.g., after X cycles or Y clock time), a point of execution within the virtual prototype simulation (e.g., before breakpoint A), and/or identification of an event within the virtual prototype simulation. In a particular example, the low level virtual communication path may be used for all accesses made from 1 Advanced Peripheral Bus (APB) port, while the optimized communication path may be used for all accesses made after the operating system boot period has completed unless made via the 1 APB port.

To optimize timing during execution of the virtual prototype simulation including the multimode model, clocking of accesses routed over the low level virtual communication path can be constrained to a period of time encompassing the access transaction plus propagation of side effects (if any) of the access transaction. In a first example, a transaction may be executed for a number of clock cycles predetermined as providing a sufficient period of time for the transaction. The number of clock cycles, for example, may be based on one or more of a type of access, a memory region being accessed, or other data provided in relation to the access. In a second example, activity surrounding execution of the access transaction may be monitored to determine when a quiescent state has been reached. Activity, for example, may be monitored via activity pins (e.g., as provided for power monitoring). In a third example, internal model activity may be monitored during execution of the access transaction to identify when a quiescent state has been reached. For example, the Carbon OnDemand utility by Carbon Design Systems of Acton, Mass. may be used to track the state of internal registers to determine when quiescent state has been reached.

In one aspect, the present disclosure relates to a method including accessing a virtual prototype including one or more virtual models, where the virtual prototype is configured, upon execution, to perform a simulation of at least a portion of a hardware design. At least one virtual model of the one or more virtual models includes two or more virtual communication paths for performance of a particular transaction, where a first virtual communication path of the two or more virtual communication paths simulates access via one or more functional representations of a particular communication path of the hardware design, and a second virtual communication path of the two or more virtual communication paths simulates bypass of all functional representations of the particular communication path of the hardware design. The method may include identifying, by a processor of a computing device, access criteria defining conditions for selection of each virtual communication path of the two or more virtual communication paths, and causing, by the processor, execution of the simulation, where executing the simulation includes executing, based upon at least a portion of the access criteria, one or more transactions via the first virtual communication path, and one or more transactions via the second virtual communication path.

In some embodiments, a first functional representation of the one or more functional representations is a memory controller, a bus fabric, or a memory mapped peripheral. The hardware design may include an integrated embedded system design. The hardware design may include a system on a chip (SoC) design.

In some embodiments, the virtual prototype is a loosely-timed prototype or an approximately-timed prototype. The access criteria may include a number of access rules. The number of access rules may include at least one user-defined access rule.

In one aspect, the present disclosure relates to a system including a processor and a memory having instructions stored thereon, where the instructions, when executed by the processor, cause the processor to access a first virtual model of a portion of a hardware design, where the first virtual model is configured, upon execution, to perform a cycle accurate simulation of the portion of the hardware design. The instructions, when executed, may cause the processor to generate, based at least in part upon the first virtual model, a multimode virtual model of the portion of the hardware design, where the multimode virtual model includes two or more virtual communication paths for access transactions, where a first virtual communication path of the two or more virtual communication paths simulates access via one or more functional representations of a particular communication path of the hardware design, and a second virtual communication path of the two or more virtual communication paths simulates bypass of at least one of the one or more functional representations of the particular communication path, and an access router configured to route access transactions via the two or more virtual communication paths.

In some embodiments, the instructions, when executed, cause the processor to access memory size information of the hardware design. The multimode virtual model may be generated based in part upon the memory size information. The instructions, when executed, may cause the processor to access memory port mapping information of the hardware design. The multimode virtual model may be generated based in part upon the memory port mapping information.

The multimode virtual model may include a clock generator for timing access transactions conducted via the second virtual communication path.

In some embodiments, generating the first virtual model includes generating the access router based at least in part upon access rules defined by a user. The access router may be configured to route access transactions based at least in part upon a memory region accessed, a physical connection port used for the access, and/or a port type used for the access. The access router may be configured to route access transactions based at least in part on a point of time within the simulation, a point of execution within the simulation, and/or identification of an event within the simulation.

In one aspect, the present disclosure relates to a non-transitory computer readable medium having instructions stored thereon, where the instructions, when executed by a processor, cause the processor to access a virtual prototype including one or more virtual models, where the virtual prototype is configured, upon execution, to perform a simulation of at least a portion of a hardware design, and at least one virtual model of the one or more virtual models includes two or more virtual communication paths for access transactions, where a first virtual communication path of the two or more virtual communication paths simulates access via one or more functional representations of a particular communication path of the hardware design, and a second virtual communication path of the two or more virtual communication paths simulates bypass of at least one of the one or more functional representations of the particular communication path. The instructions, when executed, may cause the processor to cause execution of the simulation, where executing the simulation includes executing one or more access transactions via the first virtual communication path, where execution of each of the one or more access transactions via the first virtual communication path includes performing a timed access operation, and executing one or more access transactions via the second virtual communication path, where execution of the one or more transactions via the second virtual communication path includes performing an untimed access operation.

In some embodiments, performing the timed access operation includes constraining a timing period of the access transaction to a first period of time encompassing an access transaction and a second period of time encompassing propagation of side effects of the timed access operation. Performing the timed access operation may include monitoring activity to identify a quiescent state, where constraining the second period of time includes concluding the second period of time upon identification of the quiescent state.

In some embodiments, performing the timed access operation includes engaging a clock generator to simulate a number of clock cycles, where the timing period includes the number of clock cycles. Performing the untimed access operation may include suspending activity of the clock generator. Executing the simulation may include executing an access router, where the access router routes at least one access transaction via the first virtual communication path, and routes at least one access transaction via the second virtual communication path.

BRIEF DESCRIPTION OF THE FIGURES

The foregoing and other objects, aspects, features, and advantages of the present disclosure will become more apparent and better understood by referring to the following description taken in conjunction with the accompanying drawings, in which.

The features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

Figure 1A:
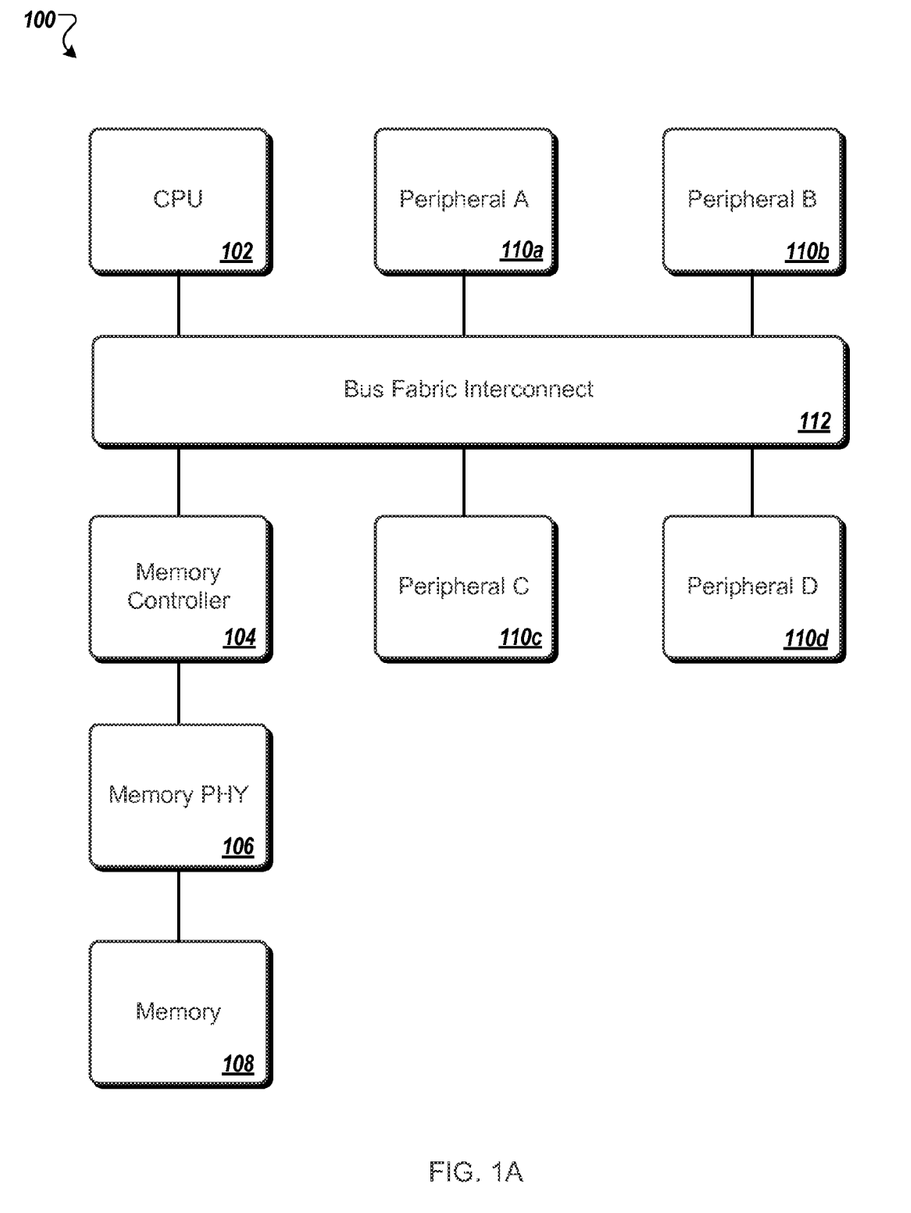
FIG. 1A is a block diagram of an example hardware design.

FIG. 1A is a block diagram of an example hardware design 100 that may serve as the basis for development of a virtual prototype. For example, each component identified within the hardware design 100 may be represented by a separate virtual model. Components illustrated include a central processing unit (CPU) 102, a memory controller 104, a memory PHY 106, a memory 108, and a number of peripheral elements 110a through 110d (e.g., UART, NAND Flash, NOR Flash, DDRx, Modem, PCI-Express, I2C, I2S, MIPI, HDMI, LCD Controller, SATA, SDIO, SATA, S/PDIF, USB, USB OTG, Ethernet, etc.). Various elements are interconnected by a bus fabric interconnect 112, providing communication paths between the elements.

In some implementations, one or more of the elements of the hardware design 100 may be represented by a multimode virtual model including two or more redundant virtual communication paths for accesses made by the virtual model to provide for both accelerated access transactions and time-accurate access transactions. Selection of the redundant virtual communication paths, for example, may be used during execution of the virtual prototype simulation to accelerate at least portions of the execution of the simulation.

In the hardware being modeled by the multimode model, an access path includes two or more functional representations. The functional representations may include one or more of the elements illustrated in the hardware design 100. For example, turning to FIG. 1B, a block diagram of the example hardware design of FIG. 1A includes a multimode model 122 of the memory controller interface 104 of the hardware design 100, where functional representations of the memory controller 104 and/or the memory PHY 106 may be selectively bypassed by an access router 124 configured for selective access to either a cycle accurate virtual communication path to the memory 108 (e.g., via the memory controller 104 and the memory PHY 106) or a fast virtual communication path to the memory 108 (e.g., directly connected to the access router 124). Upon selection of the fast virtual communication path, a clock generator 126 may be suspended, allowing the access router 124 to effect a memory access transaction via the memory 108 as an untimed transaction. Conversely, upon selection of the cycle accurate virtual communication path, the clock generator 126 may be engaged by the access router 124 to drive the memory access transaction through the multimode model and propagate any side effects of the transaction. To measure the period of time for propagation of side effects, in one example, the clock generator may generate clock cycles until it is determined that the system has reached a quiescent state. For example, activity surrounding execution of the access transaction may be monitored via activity pins (e.g., as provided for power monitoring) to determine when a quiescent state has been reached. In another example, internal model activity may be monitored during execution of the access transaction to identify when a quiescent state has been reached. Further to this example, the Carbon OnDemand utility by Carbon Design Systems of Acton, Mass. may be used to track the state of internal registers to determine when quiescent state has been reached.

Figure 1B:
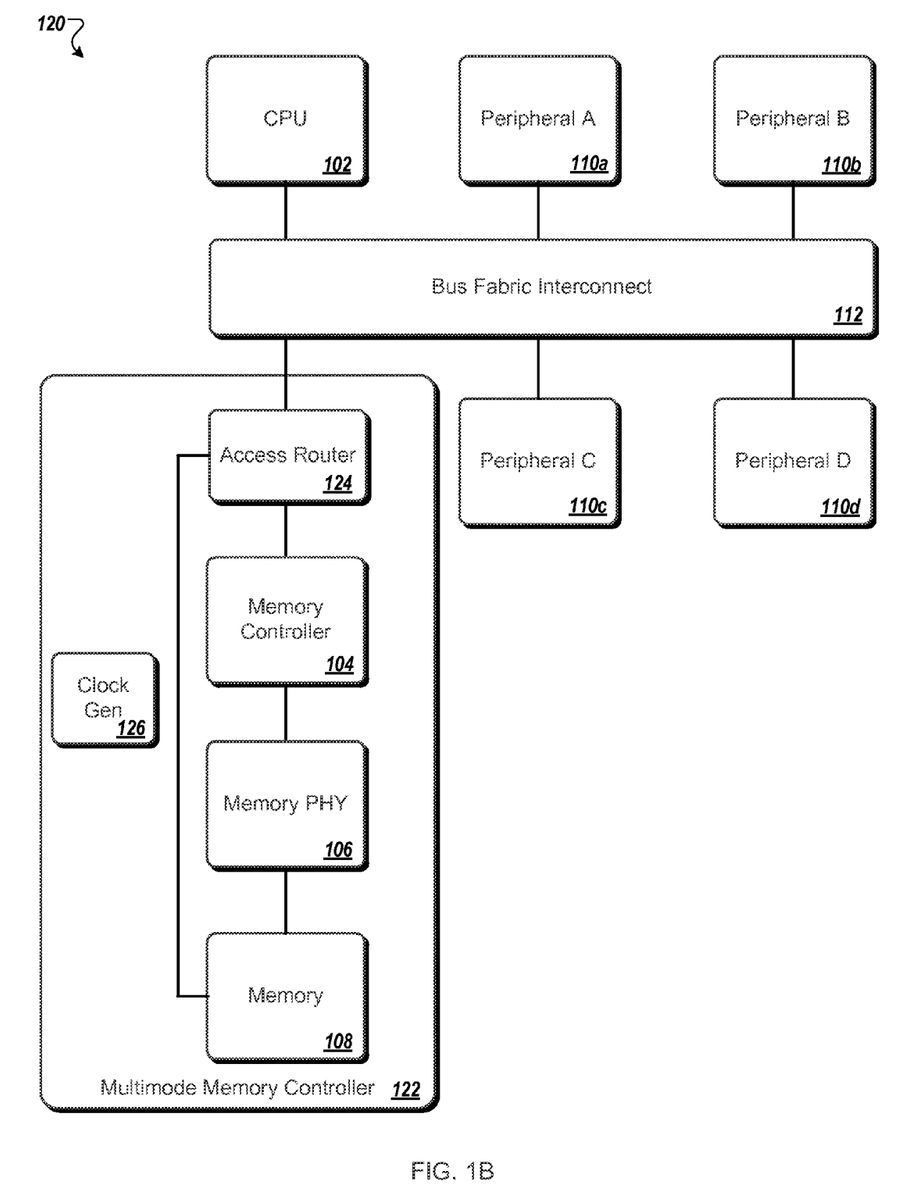
FIG. 1B is a block diagram of the example hardware design of FIG. 1A including a multimode model of the memory controller interface of the hardware design.

Although the clock generator 126, as illustrated, is included within the multimode model 122, in some implementations, the clock generator 126 may be used to track timing of a system-wide clock generator and simply forward the signal when it is needed as determined by the access router.

Figure 1C:
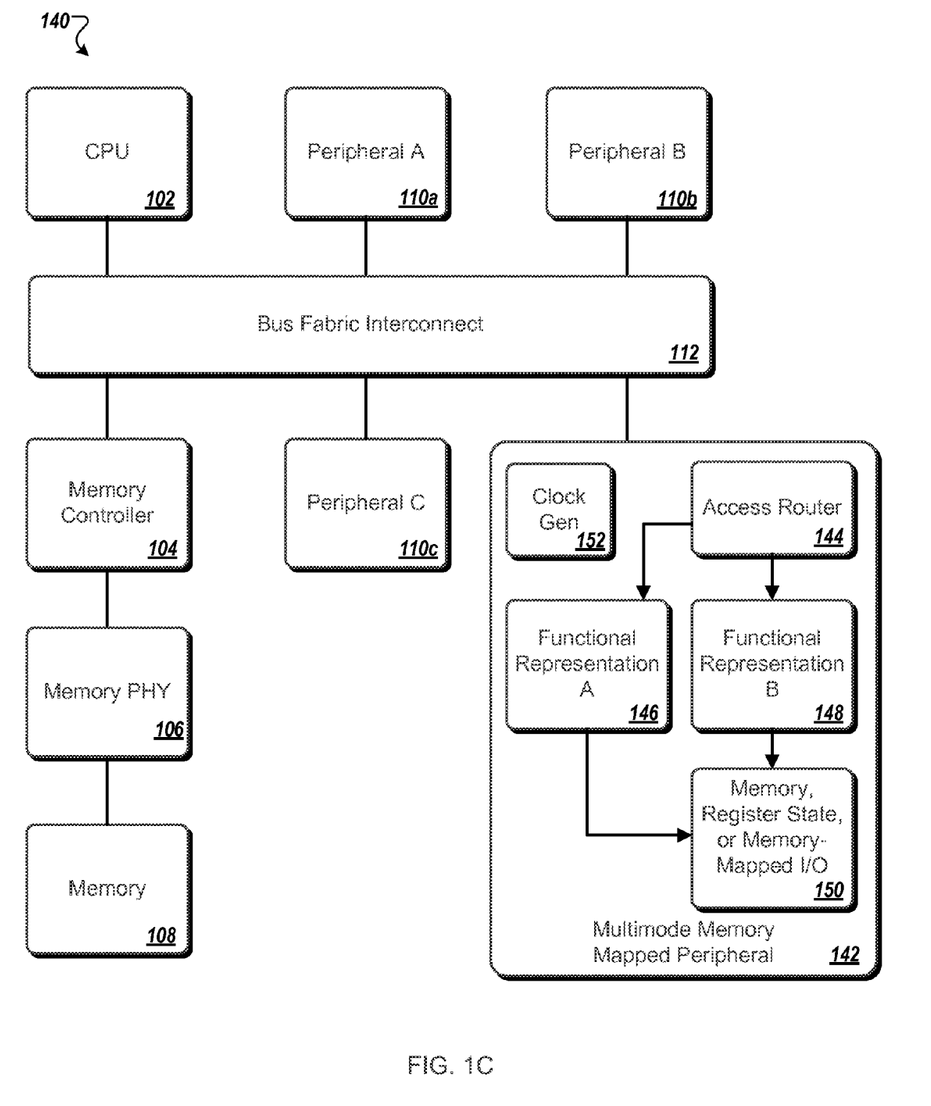
FIG. 1C is a block diagram of the example hardware design of FIG. 1A including a multimode model of a peripheral hardware element of the hardware design.

In another example, turning to FIG. 1C, a block diagram of the example hardware design 100 of FIG. 1A includes a separate multimode model 142 of the peripheral hardware element 110*d* of the hardware design 100. The peripheral hardware element 110*d*, as noted in relation to FIG. 1A, may represent a UART, NAND Flash, NOR Flash, DDRx, Modem, PCI-Express, I2C, I2S, MIPI, HDMI, LCD Controller, SATA, SDIO, SATA, S/PDIF, USB, USB OTG, or Ethernet hardware element, in some examples. As illustrated in the peripheral multimode model 142, an access router 144 may be configured to selectively route transactions to an accessed element 150 via a first functional representation 146 (e.g., a fast mode representation) and/or a second functional representation 148 (e.g., a cycle accurate model representation). When the access router 144 directs a transaction along the cycle accurate model representation (e.g., the second functional representation 148), a clock generator 152 may be engaged to manage timing of the transaction. Conversely, when the access router 144 directs a transaction along the fast model representation (e.g., the first functional representation 146), the clock generator 152 may be suspended.

In managing routing decisions, an access router, such as the access router 124 of the memory controller multimode model 122 or the access router 144 of the peripheral element multimode model 142, in some implementations, is configured with a set of criteria or routing rules based upon a number of factors associated with a particular transaction. The criteria or rules may be used during execution of the access router to route transaction accesses within the multimode model. For example, selection of the particular virtual communication path to use to perform a particular access (e.g., read, write, copy, etc.) may be based upon one or more of a memory region accessed, a physical connection port used for the access, a port type used for the access, a point of time within the virtual prototype simulation (e.g., after X cycles or Y clock time), a point of execution within the virtual prototype simulation (e.g., before breakpoint A), and/or identification of an event within the virtual prototype simulation. In a particular example, the cycle accurate virtual communication path may be used for all accesses made from 1 APB port, while the fast communication path may be used for all accesses made after the operating system boot period has completed unless made via the 1 APB port. In some implementations, a user may configure at least a portion of the access criteria or rules associated with the two or more redundant communication paths, for example as input to creation of the multimode model. In some examples, during creation of the multimode model, the access router may be configured with a case statement, lookup table, or other logic to implement the access criteria or rules.

Figure 2:
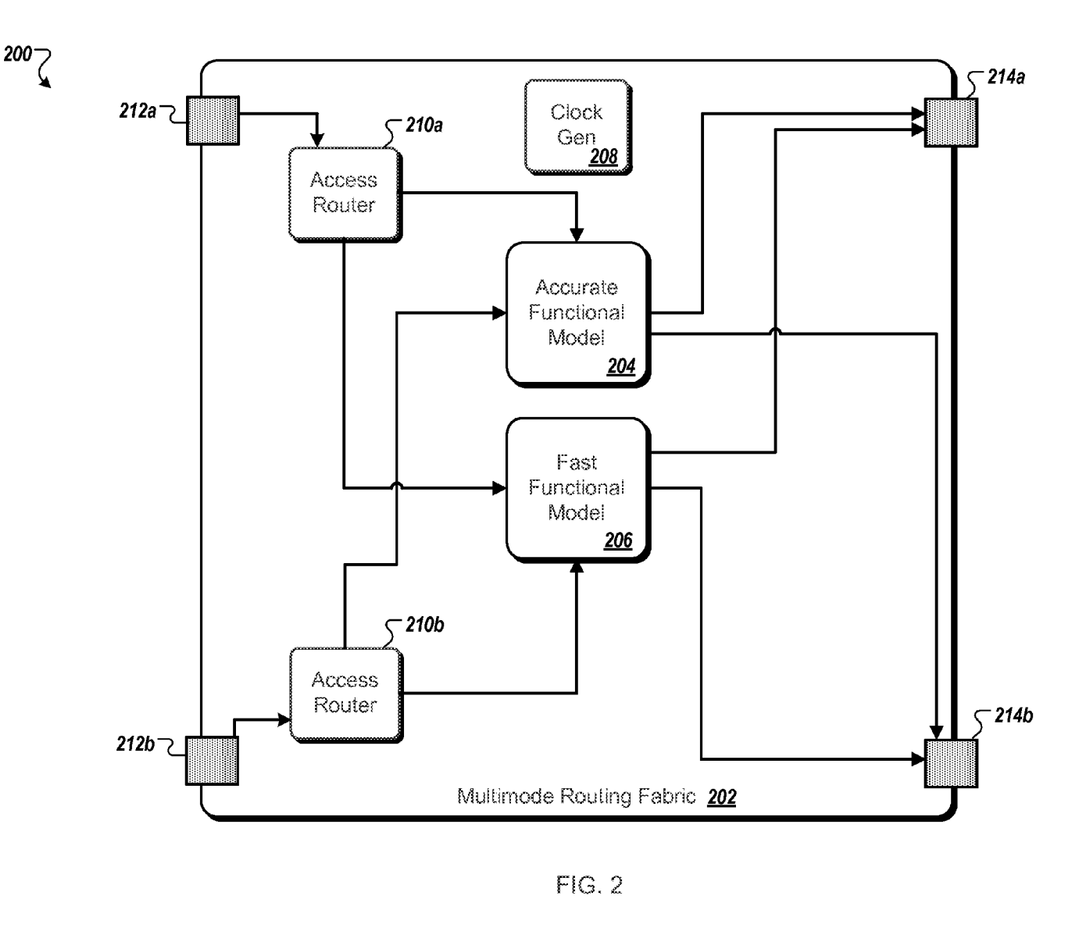
FIG. 2 is a block diagram of a multimode routing fabric.

FIG. 2 is a block diagram 200 of a multimode routing fabric 202. The multimode routing fabric 202 is established to communicate transactions (e.g., accesses to one or more memory locations, registers, and/or memory-mapped I/O connections) between a set of master I/O ports 212*a* and 212*b* and a set of slave I/O ports 214*a* and 214*b* via respective access routers 210*a* and 210*b*. In operation, transaction information (e.g., memory access command, register access command, or memory-mapped I/O access command, etc.) received at the master I/O ports 212*a*, 212*b*, may be respectively routed by the access routers 210*a*, 210*b* to either an accurate functional model 204 or a fast functional model 206 (e.g., based upon routing criteria programmed into the individual access routers 210*a*, 210*b*). Upon exit, the transaction information may be provided by either the accurate functional model 204 or the fast functional model 206, depending on which functional model 204, 206 was selected, to one of two slave I/O ports 214*a*, 214*b*.

When a virtual communication path including the accurate functional model 204 has been selected (e.g., transaction information has been routed to the accurate functional model 204 by either the first access router 210*a* or the second access router 210*b*), a clock generator 208 maintains cycle accuracy of the access transaction. Within the accurate functional model 204, routing logic exists to simulate behaviors of the functional representations contained within the accurate functional model 204 (e.g., such as the accurate path of the multimode memory controller 122 having functional representations of the memory controller, memory PHY, and memory). The routing logic, in some examples, may simulate queues, FIFOs, registers, cache regions, and other complex routing elements within the access transaction path of the hardware design. Several clock cycles may pass to complete the transaction when routed via the accurate functional model 204.

Conversely, when the fast functional model 206 has been selected, the access may be loosely timed or untimed, without involving the clock generator 208. A virtual communication path including the fast functional model 206, for example, may include simple routing logic such as a case statement to determine which slave port 214*a*, 214*b* to select (e.g., based upon memory region being accessed). In this manner, accesses may be conducted in an accelerated manner, allowing the prototype simulation of the hardware design to complete more quickly for at least this portion of the simulation.

Figure 3:
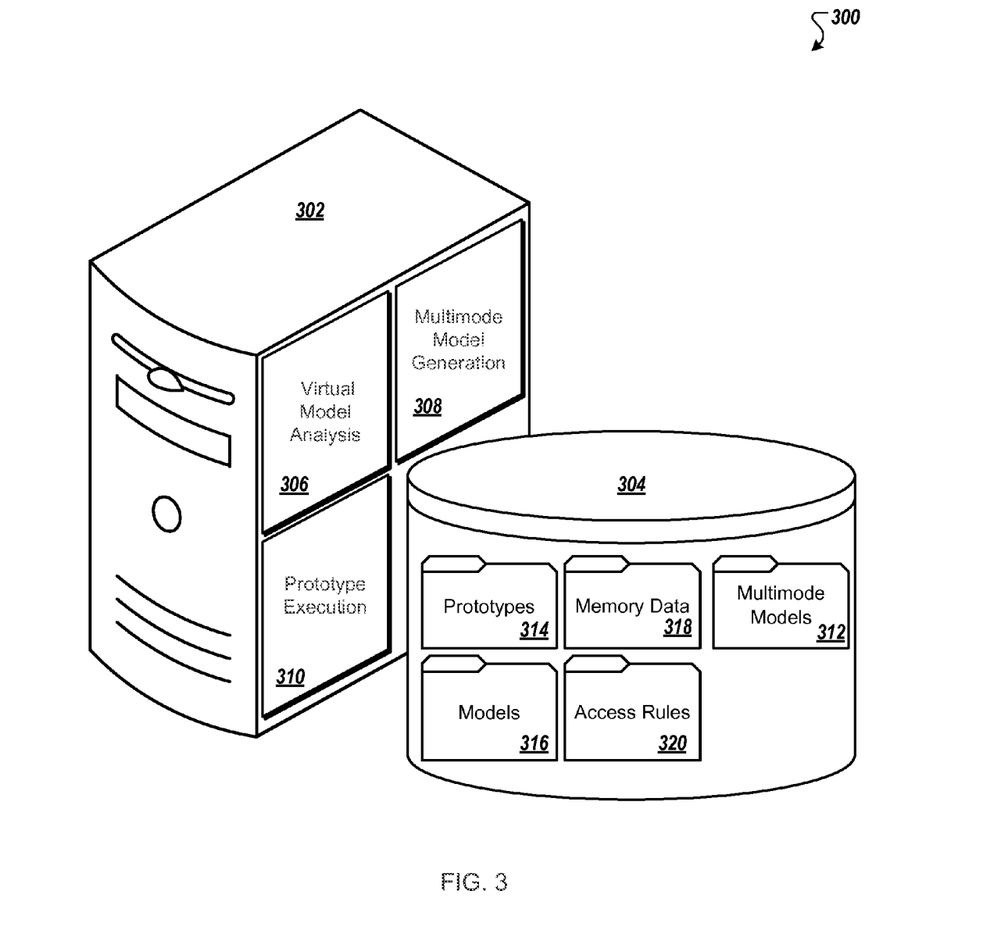
FIG. 3 is a block diagram of an example system for generating and executing virtual prototypes including multimode models.

FIG. 3 is a block diagram of an example system 300 for generating and executing virtual prototypes 314 including multimode models 312. The system 300 includes a server 302 capable of executing a virtual model analysis module 306 for analyzing one or more virtual models 316 to identify multimode functionality options, a multimode model generation module 308 for generating a multimode model 312 (e.g., automatically based upon output of the virtual model analysis module 306 or semi-automatically using access rules 320 established in part via user preferences), and a prototype execution module 310 for executing virtual prototypes 314 including one or more multimode models 312.

The system 300 includes storage 304 (e.g., one or more computer-readable storage mediums included within and/or accessible to the server 302) for storing various information related to the virtual prototypes 314. Virtual models 316 of various components of a hardware design, for example, may be combined into a virtual prototype 314 which, upon execution, performs a simulation of the hardware design.

In order to achieve faster execution speed of a virtual prototype simulation, in some implementations, one or more of the models 316 may be expanded into multimode models 312, each multimode model 312 including at least two hardware models, each hardware model modeling one or more hardware functional representations. The at least two models may include, for example, both a fast (e.g., untimed or loosely timed) model and a cycle-accurate model. Access rules 320, for example, may define circumstances in which each of the at least two models should be accessed during a virtual prototype simulation. Memory data 318 (additionally or alternatively memory-mapped I/O information and/or port configuration information) may provide information regarding memory layout needed to generate the multimode routing fabric for a particular multimode model 312.

Figure 4A:
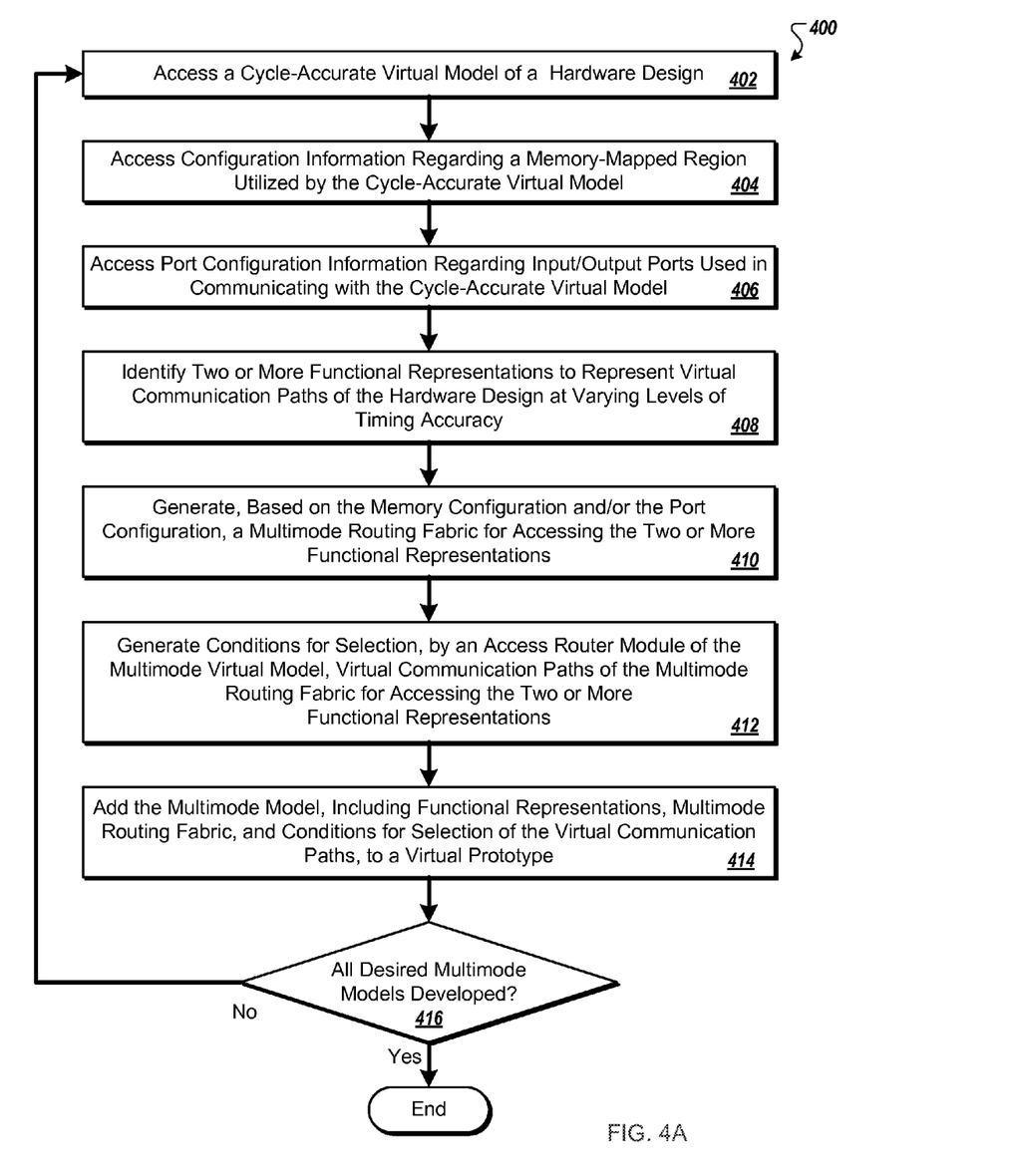
FIG. 4A is a flow chart of an example method for establishing a multimode virtual prototype model of a hardware design.
Figure 4B:
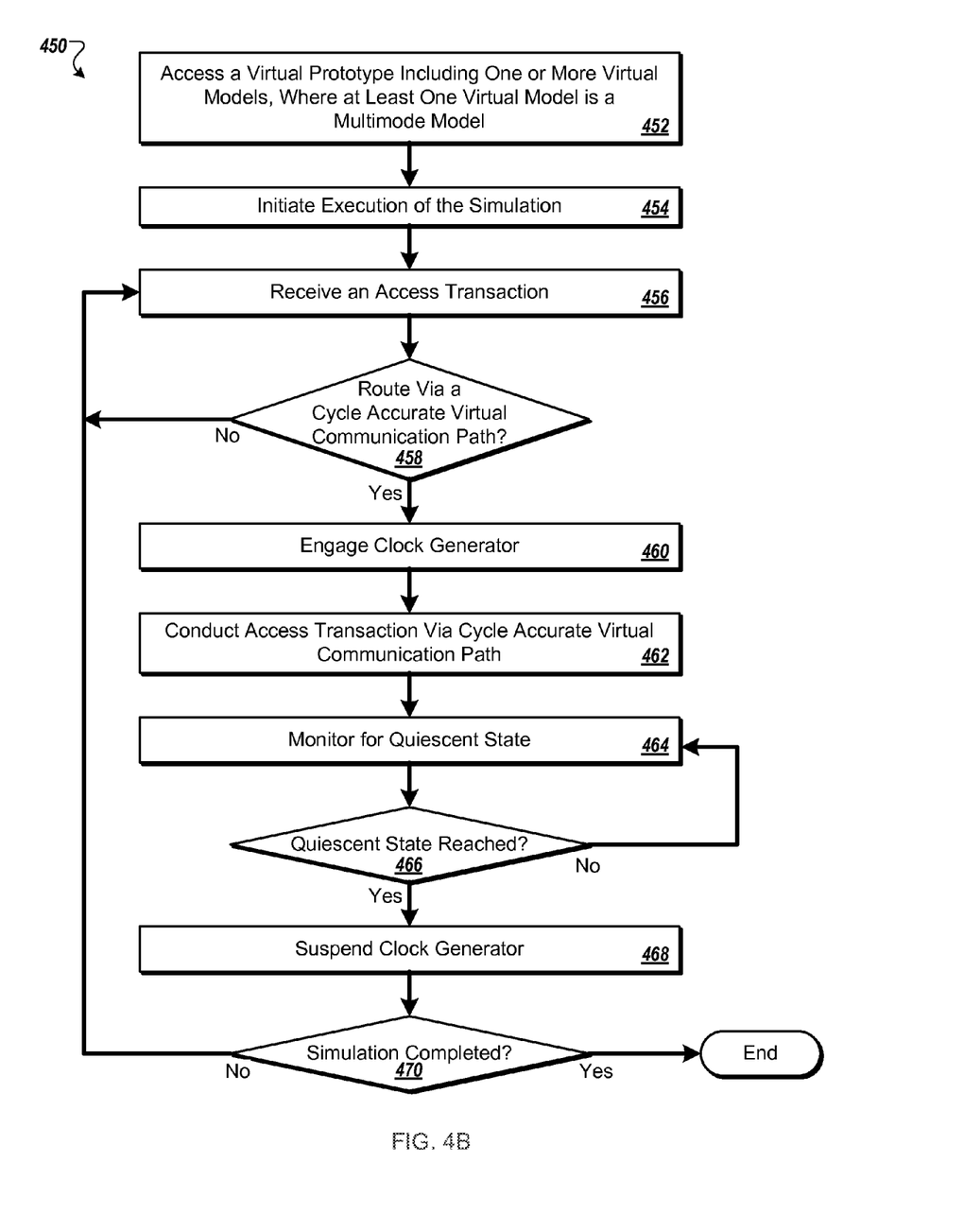
FIG. 4B is a flow chart of an example method for executing a virtual prototype simulation of a hardware design including a multimode virtual prototype model.

FIGS. 4A and 4B illustrate a flow chart of an example method 400 for establishing a multimode virtual prototype model of a hardware design. The method 400 may be performed, for example, by one or both of the virtual model analysis module 306 and the multimode model generation module 308 as described in relation to FIG. 3.

In some implementations, the method 400 begins with accessing a cycle-accurate virtual model of a hardware design (402). The cycle-accurate virtual model is a virtual representation of a hardware component such as, in some examples, a central processing unit, bus fabric interconnect, memory controller, memory PHY, or other peripheral element. The cycle-accurate virtual model 316, for example, may be accessed from the storage 304 by the virtual model analysis module 306, as illustrated in FIG. 3.

In some implementations, configuration information regarding a memory-mapped region utilized by the cycle-accurate virtual model is accessed (404). The configuration information, in some examples, may include a memory size, start addresses of memory-mapped regions, end addresses of regions, and/or port/pin configurations of the element represented within the virtual model. The virtual model analysis module 306 of FIG. 3, for example, may access data 318 associated with a particular virtual model 316 from storage 304.

In some implementations, port configuration information regarding I/O ports used in communicating with the cycle-accurate virtual model is accessed (406). The I/O port information, in some examples, may include port mappings (e.g., to various command assertions, memory-mapped access regions, etc.), port modes (e.g., as selected by a mode pin of the hardware element), and/or port access methods (e.g., serial access, parallel access, etc.). The I/O port information, for example, may be included within the information regarding the virtual model 316, as illustrated in relation to FIG. 3. In another example, the I/O port information may be accessed through separate hardware component specification data (not illustrated). The virtual model analysis module 306 of FIG. 3 may access the I/O port information. Alternatively, the I/O port information may be derived from the corresponding virtual model 316.

In some implementations, two or more functional representations are identified (408). Each functional representation, for example, may functionally represent one or more hardware components of the hardware design (or communication fabric for communicating between components). The functional representations, for example, may include at least one cycle-accurate functional representation and at least one untimed (e.g., fast) functional representation. The cycle accurate functional representation(s), for example, may be used to define (alone or in combination, depending upon the number of functional representations involved) a cycle accurate model of the multimode model, while the untimed functional representation(s) may be used to define a fast model of the multimode model. At least one model of the multimode model (e.g., the cycle accurate model) is associated with a clock generator to provide timing for transactions conducted via the particular model. The clock generator, in some implementations, is a locally-based clock (e.g., provided to simulate timing in the virtual model). In other implementations, the clock generator is linked to a higher level (e.g., shared between two or more multimode models or virtual prototype wide) clock module, for example to coordinate timing of activities within the hardware design during simulation.

In some implementations, a multimode routing fabric of the cycle-accurate virtual model of the hardware design is generated (410). The multimode routing fabric, for example, may account for the memory configuration and/or the port configuration in establishing the virtual communication paths between a particular entry point (e.g., port) and a memory (or memory region) via at least one of the two or more virtual models of the multimode model for conducting access transactions. An example multimode routing fabric is illustrated in FIG. 3. The multimode model generation module 308 of FIG. 3, for example, may be used to generate the multimode routing fabric.

In some implementations, conditions for selection of virtual communication paths of the multimode routing fabric are generated (412). The conditions, for example, may include a set of circumstances for selection of a particular virtual communication path for traversing each of the models of the multimode model during execution of a virtual prototype simulation. The conditions for selection, for example, can include access criteria or rules associated with the two or more virtual communication paths. For example, selection of the particular virtual communication path to use to perform a particular access (e.g., read, write, copy, etc.) may be based upon one or more of a memory region accessed, a physical connection port used for the access, a port type used for the access, a point of time within the virtual prototype simulation (e.g., after X cycles or Y clock time), a point of execution within the virtual prototype simulation (e.g., before breakpoint A), and/or identification of an event within the virtual prototype simulation. The conditions for selection, for example, may be established by the multimode model generation module 308 and stored in the storage 304 as access rules 320. In some implementations, at least a portion of the conditions for selection are identified based upon user configuration and/or preferences. For example, a user may identify a particular breakpoint or set of circumstances at which to switch from a fast model (e.g., untimed) execution of the multimode model to a cycle accurate model execution of the multimode model (and back). In other implementations, the conditions for selection are fully automated.

The conditions for selection may be used to program an access router such as the access routers 210*a*, 210*b* described in relation to FIG. 2. For example, the multimode model generation module 308 may determine a set of conditions, potentially based in part upon user input, and create programming code, such as a case statement, for programming the functionality of at least one access router of the multimode model.

The number of access routers within the multimode model, in some implementations, is determined based upon the conditions for selection. For example, if conditions are port-specific, different access routers may be established for different ports (e.g., a first access router for ports of a first type and a second access router for ports of a second type, a separate access router for each access port, etc.). The multimode model generation module 308 of FIG. 3, for example, may determine an access router configuration appropriate for the multimode model.

In some implementations, the multimode model, including the virtual models, the functional representation(s) within each virtual model, multimode routing fabric, and conditions for selection of the virtual communication paths within the multimode routing fabric, are added to a virtual prototype (414). The multimode model generation module 308 of FIG. 3, for example, may add the multimode model to a particular virtual prototype 314 in preparation for execution of a simulation by the prototype execution module 310.

In some implementations, it is determined whether all desired multimode models have been developed for the particular virtual prototype (416). A virtual prototype, in some implementations, may include a number of multimode models, each multimode model representing a different hardware component of the hardware design being simulated. Steps 402 through 414 may be repeated until all desired multimode models have been generated.

FIG. 4B is a flow chart of an example method 450 for executing a virtual prototype simulation of a hardware design including a multimode virtual prototype model. The virtual prototype simulation may be executed by the prototype execution module 310, described in relation to FIG. 3.

In some implementations, the method 450 begins with accessing a virtual prototype including one or more virtual models, where at least one virtual model is a multimode model (452). The multimode virtual prototype model of the virtual prototype simulation, for example, may have been established using the method 400 as described in relation to FIG. 4A. As illustrated in relation to FIG. 3, the virtual prototype, including models 316 and at least one multimode model 312, may be accessed from storage medium 304.

In some implementations, execution of the virtual prototype simulation is initiated (454). Execution may be initiated, for example, by the prototype execution module 310 of FIG. 3. In some implementations, only a portion of a simulation is executed. For example, the simulation may be executed from a particular starting point and/or until a particular end point.

In some implementations, an access transaction is received (456). The access transaction may be received, for example, by an access router such as the access routers 210 described in relation to FIG. 2.

In some implementations, it is determined whether to route the access transaction via a cycle accurate virtual communication path (458). The cycle accurate virtual communication path, for example, traverses one or more cycle-accurate functional representations of the multimode model. The determination may be made, in some examples, using access rules such as the access rules 320 described in relation to FIG. 3. Conversely, the access router may be programmed based at least in part upon access rules 320 or other access criteria. Determining whether to route the access transaction via the cycle accurate virtual communication path may involve identifying transaction-related information such as, in some examples, a memory region accessed, a physical connection port used for the access, and/or a port type used for the access. In other examples, determining whether to route the access transaction via the cycle accurate virtual communication path may involve identifying simulation-related information such as, in some examples, a point of time within the simulation, a point of execution within the simulation, and/or identification of an event within the simulation. The access criteria used to route the transaction, for example, may involve any combination of transaction-related information and/or simulation-related information.

In some implementations, if the access transaction is to be routed via the cycle accurate virtual communication path (458), a clock generator is engaged (460). The clock generator, such as the clock generator 126 described in relation to FIG. 1B or the clock generator 152 described in relation to FIG. 1C, may track clock cycles while the access transaction is conducted.

In some implementations, while the clock generator is engaged, the access transaction is conducted via the cycle accurate virtual communication path (462). The access transaction, for example, may traverse one or more cycle-accurate functional representations to access a location. Timing of the access transaction may depend at least in part upon the type of access (e.g., read, modify, write, etc.), size of access, and/or type of storage medium being simulated.

In some implementations, a section of the virtual prototype is monitored for a quiescent state (464). In some implementations, maintaining timing includes measuring a period of time for propagation of side effects of the access transaction. To measure the period of time for propagation of side effects, in one example, the clock generator may capture clock cycles until it is determined that the system has reached a quiescent state. For example, activity surrounding execution of the access transaction may be monitored via activity pins (e.g., as provided for power monitoring) to determine when a quiescent state has been reached. In another example, internal model activity may be monitored during execution of the access transaction to identify when a quiescent state has been reached. Further to this example, the Carbon OnDemand utility by Carbon Design Systems of Acton, Mass. may be used to track the state of internal registers to determine when quiescent state has been reached.

If a quiescent state has been reached (466), in some implementations, the clock generator is suspended (468). In this manner, only those portions of the simulation designated for cycle accurate simulation are tracked by a clock generator, while other portions may be simulated in a fast (e.g., untimed or loosely timed) mode.

In some implementations, the method 450 continues with receiving additional access transactions (456) until an end of simulation is identified (470). The end of simulation, in some implementations, includes a completion of the virtual prototype simulation. In other implementations, simulation-related information such as, in some examples, a point of time within the simulation, a point of execution within the simulation, and/or identification of an event within the simulation may designate an end to transaction processing by a cycle accurate model of the multimode model. For example, a point may be reached at which the simulation proceeds with all access transactions routed through a fast model portion of the virtual model (e.g., such as the fast functional model 206 illustrated in relation to FIG. 2).

Although illustrated in relation to a particular series of steps, in other implementations, the method 450 may include additional steps. In further implementations, one or more steps may be removed from the method 450, or one or more steps of the method 450 may be performed in a different order. For example, in some implementations, the transactions themselves may be timed by the clock generator (e.g., by engaging the clock generator (460) and conducting the access transaction (462), but the method 450 may be conducted without monitoring for a quiescent state (464). In further implementations, rather than monitoring for a quiescent state (464), the virtual prototype simulation may add a set number of clock cycles to the access transaction to account for processing of side-effects. The set number of clock cycles, for example, may depend upon transaction type.

Figure 5:
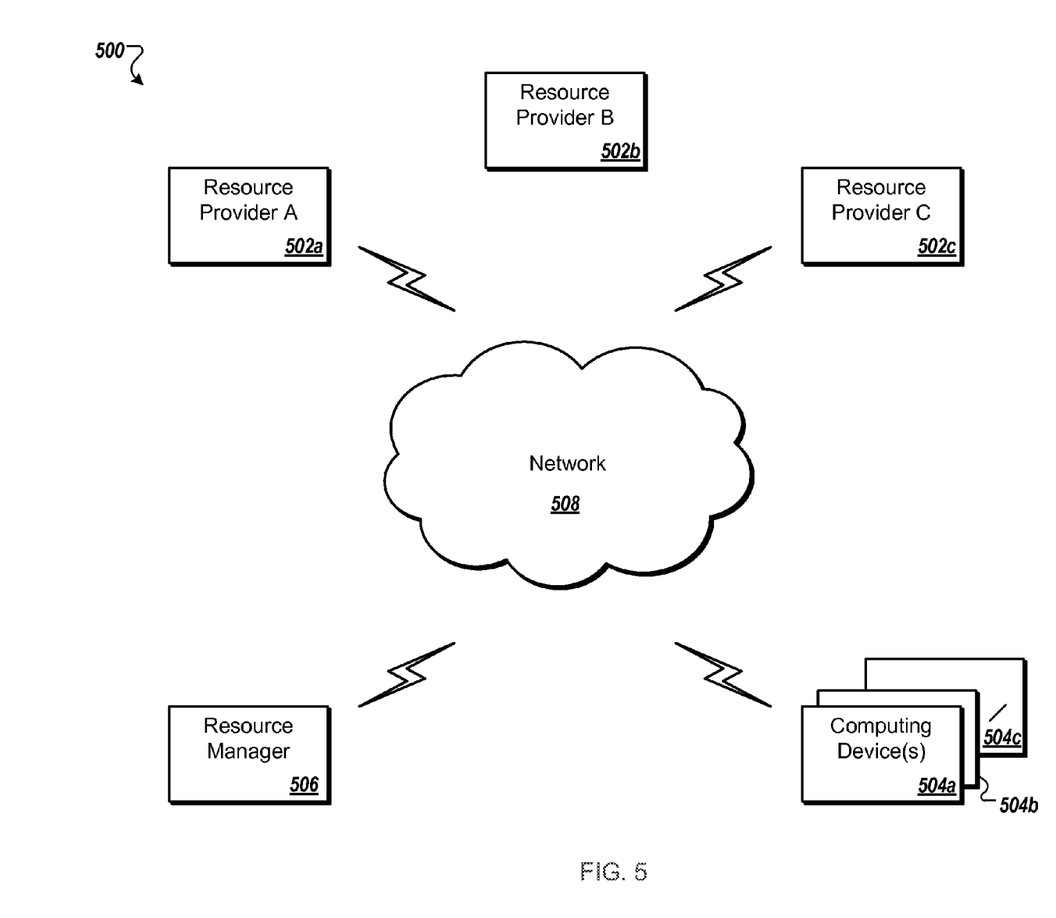
FIG. 5 is a block diagram of another example network environment for creating software applications for computing devices.

As shown in FIG. 5, an implementation of an exemplary cloud computing environment 500 for supporting multimode execution of a virtual prototype simulation of a hardware design is shown and described. The cloud computing environment 500 may include one or more resource providers 502a, 502b, 502c (collectively, 502). Each resource provider 502 may include computing resources. In some implementations, computing resources may include any hardware and/or software used to process data. For example, computing resources may include hardware and/or software capable of executing algorithms, computer programs, and/or computer applications. In some implementations, exemplary computing resources may include application servers and/or databases with storage and retrieval capabilities. Each resource provider 502 may be connected to any other resource provider 502 in the cloud computing environment 500. In some implementations, the resource providers 502 may be connected over a computer network 508. Each resource provider 502 may be connected to one or more computing device 504a, 504b, 504c (collectively, 504), over the computer network 508.

The cloud computing environment 500 may include a resource manager 506. The resource manager 506 may be connected to the resource providers 502 and the computing devices 504 over the computer network 508. In some implementations, the resource manager 506 may facilitate the provision of computing resources by one or more resource providers 502 to one or more computing devices 504. The resource manager 506 may receive a request for a computing resource from a particular computing device 504. The resource manager 506 may identify one or more resource providers 502 capable of providing the computing resource requested by the computing device 504. The resource manager 506 may select a resource provider 502 to provide the computing resource. The resource manager 506 may facilitate a connection between the resource provider 502 and a particular computing device 504. In some implementations, the resource manager 506 may establish a connection between a particular resource provider 502 and a particular computing device 504. In some implementations, the resource manager 506 may redirect a particular computing device 504 to a particular resource provider 502 with the requested computing resource.

Figure 6:
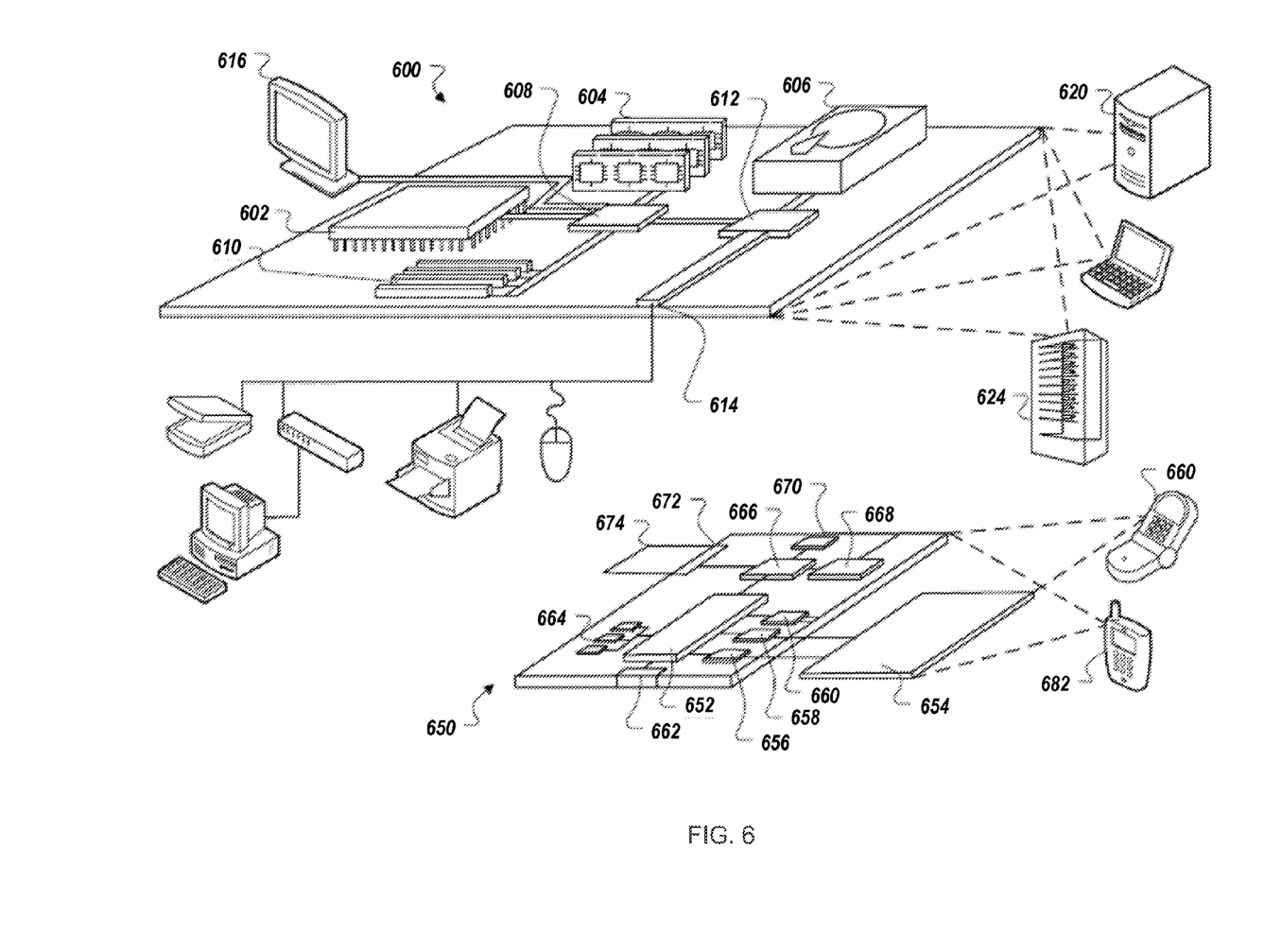
FIG. 6 is a block diagram of a computing device and a mobile computing device.

FIG. 6 shows an example of a computing device 600 and a mobile computing device 650 that can be used to implement the techniques described in this disclosure. The computing device 600 is intended to represent various forms of digital computers, such as laptops, desktops, workstations, personal digital assistants, servers, blade servers, mainframes, and other appropriate computers. The mobile computing device 650 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 600 includes a processor 602, a memory 604, a storage device 606, a high-speed interface 608 connecting to the memory 604 and multiple high-speed expansion ports 610, and a low-speed interface 612 connecting to a low-speed expansion port 614 and the storage device 606. Each of the processor 602, the memory 604, the storage device 606, the high-speed interface 608, the high-speed expansion ports 610, and the low-speed interface 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as a display 616 coupled to the high-speed interface 608. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 604 stores information within the computing device 600. In some implementations, the memory 604 is a volatile memory unit or units. In some implementations, the memory 604 is a non-volatile memory unit or units. The memory 604 may also be another form of computer-readable medium, such as a magnetic or optical disk.

The storage device 606 is capable of providing mass storage for the computing device 600. In some implementations, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 602), perform one or more methods, such as those described above. The instructions can also be stored by one or more storage devices such as computer- or machine-readable mediums (for example, the memory 604, the storage device 606, or memory on the processor 602).

The high-speed interface 608 manages bandwidth-intensive operations for the computing device 600, while the low-speed interface 612 manages lower bandwidth-intensive operations. Such allocation of functions is an example only. In some implementations, the high-speed interface 608 is coupled to the memory 604, the display 616 (e.g., through a graphics processor or accelerator), and to the high-speed expansion ports 610, which may accept various expansion cards (not shown). In the implementation, the low-speed interface 612 is coupled to the storage device 606 and the low-speed expansion port 614. The low-speed expansion port 614, which may include various communication ports (e.g., USB, Bluetooth®, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. In addition, it may be implemented in a personal computer such as a laptop computer 622. It may also be implemented as part of a rack server system 624. Alternatively, components from the computing device 600 may be combined with other components in a mobile device (not shown), such as a mobile computing device 650. Each of such devices may contain one or more of the computing device 600 and the mobile computing device 650, and an entire system may be made up of multiple computing devices communicating with each other.

The mobile computing device 650 includes a processor 652, a memory 664, an input/output device such as a display 654, a communication interface 666, and a transceiver 668, among other components. The mobile computing device 650 may also be provided with a storage device, such as a micro-drive or other device, to provide additional storage. Each of the processor 652, the memory 664, the display 654, the communication interface 666, and the transceiver 668, are interconnected using various buses, and several of the components may be mounted on a common motherboard or in other manners as appropriate.

The processor 652 can execute instructions within the mobile computing device 650, including instructions stored in the memory 664. The processor 652 may be implemented as a chipset of chips that include separate and multiple analog and digital processors. The processor 652 may provide, for example, for coordination of the other components of the mobile computing device 650, such as control of user interfaces, applications run by the mobile computing device 650, and wireless communication by the mobile computing device 650.

The processor 652 may communicate with a user through a control interface 658 and a display interface 656 coupled to the display 654. The display 654 may be, for example, a TFT (Thin-Film-Transistor Liquid Crystal Display) display or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may provide communication with the processor 652, so as to enable near area communication of the mobile computing device 650 with other devices. The external interface 662 may provide, for example, for wired communication in some implementations, or for wireless communication in other implementations, and multiple interfaces may also be used.

The memory 664 stores information within the mobile computing device 650. The memory 664 can be implemented as one or more of a computer-readable medium or media, a volatile memory unit or units, or a non-volatile memory unit or units. An expansion memory 674 may also be provided and connected to the mobile computing device 650 through an expansion interface 672, which may include, for example, a SIMM (Single In Line Memory Module) card interface. The expansion memory 674 may provide extra storage space for the mobile computing device 650, or may also store applications or other information for the mobile computing device 650. Specifically, the expansion memory 674 may include instructions to carry out or supplement the processes described above, and may include secure information also. Thus, for example, the expansion memory 674 may be provide as a security module for the mobile computing device 650, and may be programmed with instructions that permit secure use of the mobile computing device 650. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. The instructions, when executed by one or more processing devices (for example, processor 652), perform one or more methods, such as those described above. The instructions can also be stored by one or more storage devices, such as one or more computer- or machine-readable mediums (for example, the memory 664, the expansion memory 674, or memory on the processor 652). In some implementations, the instructions can be received in a propagated signal, for example, over the transceiver 668 or the external interface 662.

The mobile computing device 650 may communicate wirelessly through the communication interface 666, which may include digital signal processing circuitry where necessary. The communication interface 666 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 668 using a radio-frequency. In addition, short-range communication may occur, such as using a Bluetooth®, Wi-Fi™, or other such transceiver (not shown). In addition, a GPS (Global Positioning System) receiver module 670 may provide additional navigation- and location-related wireless data to the mobile computing device 650, which may be used as appropriate by applications running on the mobile computing device 650.

The mobile computing device 650 may also communicate audibly using an audio codec 660, which may receive spoken information from a user and convert it to usable digital information. The audio codec 660 may likewise generate audible sound for a user, such as through a speaker, e.g., in a handset of the mobile computing device 650. Such sound may include sound from voice telephone calls, may include recorded sound (e.g., voice messages, music files, etc.) and may also include sound generated by applications operating on the mobile computing device 650.

The mobile computing device 650 may be implemented in a number of different forms, as shown in the figure. For example, it may be implemented as a cellular telephone 680. It may also be implemented as part of a smart-phone 682, personal digital assistant, tablet computer, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

In view of the structure, functions and apparatus of the systems and methods described here, in some implementations, environments and methods for supporting multimode execution of a virtual prototype simulation of a hardware design are provided. Having described certain implementations of methods and apparatus for supporting multimode execution of a virtual prototype simulation of a hardware design, it will now become apparent to one of skill in the art that other implementations incorporating the concepts of the disclosure may be used. Therefore, the disclosure should not be limited to certain implementations, but rather should be limited only by the spirit and scope of the following claims.

What is claimed:

1. A method comprising:
  accessing a virtual prototype comprising one or more virtual models, wherein
    the virtual prototype is configured, upon execution, to perform a simulation of at least a portion of a hardware design, and
    at least one virtual model of the one or more virtual models comprises two or more virtual communication paths for performance of a particular transaction, wherein
      a first virtual communication path of the two or more virtual communication paths simulates access via one or more functional representations of a particular communication path of the hardware design, and
      a second virtual communication path of the two or more virtual communication paths simulates bypass of all functional representations of the particular communication path of the hardware design;
  identifying, by a processor of a computing device, access criteria defining conditions for selection of each virtual communication path of the two or more virtual communication paths; and
  causing, by the processor, execution of the simulation, wherein
    executing the simulation comprises executing, based upon at least a portion of the access criteria,
      one or more transactions via the first virtual communication path, and
      one or more transactions via the second virtual communication path.

2. The method of claim 1, wherein a first functional representation of the one or more functional representations is a memory controller, a bus fabric, or a memory mapped peripheral.

3. The method of claim 1, wherein the hardware design comprises an integrated embedded system design.

4. The method of claim 3, wherein the hardware design comprises a system on a chip (SoC) design.

5. The method of claim 1, wherein the virtual prototype is a loosely-timed prototype or an approximately-timed prototype.

6. The method of claim 1, wherein the access criteria comprise a plurality of access rules.

7. The method of claim 6, wherein the plurality of access rules comprise at least one user-defined access rule.

8. A system comprising:
  a processor; and
  a memory having instructions stored thereon, wherein the instructions, when executed by the processor, cause the processor to:
    access a first virtual model of a portion of a hardware design, wherein the first virtual model is configured, upon execution, to perform a cycle accurate simulation of the portion of the hardware design; and
    generate, based at least in part upon the first virtual model, a multimode virtual model of the portion of the hardware design, wherein the multimode virtual model comprises
      two or more virtual communication paths for access transactions, wherein
        a first virtual communication path of the two or more virtual communication paths simulates access via one or more functional representations of a particular communication path of the hardware design, and a second virtual communication path of the two or more virtual communication paths simulates bypass of at least one of the one or more functional representations of the particular communication path, and an access router configured to route access transactions via the two or more virtual communication paths.

9. The system of claim 8, wherein:

the instructions, when executed, cause the processor to access memory size information of the hardware design; and the multimode virtual model is generated based in part upon the memory size information.

10. The system of claim 8, wherein:

the instructions, when executed, cause the processor to access memory port mapping information of the hardware design; and the multimode virtual model is generated based in part upon the memory port mapping information.

11. The system of claim 8, wherein the multimode virtual model comprises a clock generator for timing access transactions conducted via the second virtual communication path.

12. The system of claim 8, wherein generating the first virtual model comprises generating the access router based at least in part upon access rules defined by a user.

13. The system of claim 8, wherein the access router is configured to route access transactions based at least in part upon a memory region accessed, a physical connection port used for the access, and/or a port type used for the access.

14. The system of claim 8, wherein the access router is configured to route access transactions based at least in part on a point of time within the simulation, a point of execution within the simulation, and/or identification of an event within the simulation.

15. A non-transitory computer readable medium having instructions stored thereon, wherein the instructions, when executed by a processor, cause the processor to:

access a virtual prototype comprising one or more virtual models, wherein the virtual prototype is configured, upon execution, to perform a simulation of at least a portion of a hardware design, and at least one virtual model of the one or more virtual models comprises two or more virtual communication paths for access transactions, wherein a first virtual communication path of the two or more virtual communication paths simulates access via one or more functional representations of a particular communication path of the hardware design, and a second virtual communication path of the two or more virtual communication paths simulates bypass of at least one of the one or more functional representations of the particular communication path; and cause execution of the simulation, wherein executing the simulation comprises executing one or more access transactions via the first virtual communication path, wherein execution of each of the one or more access transactions via the first virtual communication path comprises performing a timed access operation, and executing one or more access transactions via the second virtual communication path, wherein execution of the one or more transactions via the second virtual communication path comprises performing an untimed access operation.

16. The computer readable medium of claim 15, wherein performing the timed access operation comprises constraining a timing period of the access transaction to a first period of time encompassing an access transaction and a second period of time encompassing propagation of side effects of the timed access operation.

17. The computer readable medium of claim 16, wherein performing the timed access operation comprises monitoring activity to identify a quiescent state, wherein constraining the second period of time comprises concluding the second period of time upon identification of the quiescent state.

18. The computer readable medium of claim 15, wherein performing the timed access operation comprises engaging a clock generator to simulate a number of clock cycles, wherein a timing period off the access transaction comprises the number of clock cycles.

19. The computer readable medium of claim 18, wherein performing the untimed access operation comprises suspending activity of the clock generator.

20. The computer readable medium of claim 15, wherein executing the simulation comprises executing an access router, wherein the access router routes at least one access transaction via the first virtual communication path, and routes at least one access transaction via the second virtual communication path.

* * * * *